United States Patent
Fahrner et al.

(10) Patent No.: US 9,051,537 B2
(45) Date of Patent: Jun. 9, 2015

(54) METHOD FOR AUTOMATICALLY CONTROLLING A PIPE NETWORK

(75) Inventors: Hartmut Fahrner, Landshut (DE); Christian Esterl, Fahrenzhausen (DE); Bernhard Heinzel, Freising (DE); Bernhard Walchshausl, Freising (DE); Adrian Kunz, Munich (DE); Richard Riedl, Deutldorf (DE); Johann Schmid, Erding (DE)

(73) Assignee: KRONES AG, Neutraubling (DE)

( * ) Notice: Subject to any disclaimer, the term of this patent is extended or adjusted under 35 U.S.C. 154(b) by 649 days.

(21) Appl. No.: 13/383,244

(22) PCT Filed: Jul. 2, 2010

(86) PCT No.: PCT/EP2010/004001
§ 371 (c)(1),
(2), (4) Date: Feb. 10, 2012

(87) PCT Pub. No.: WO2011/003549
PCT Pub. Date: Jan. 13, 2011

(65) Prior Publication Data
US 2012/0130551 A1     May 24, 2012

(30) Foreign Application Priority Data
Jul. 10, 2009 (DE) .......................... 10 2009 032 547

(51) Int. Cl.
*G05D 7/00* (2006.01)
*C12C 13/00* (2006.01)
(Continued)

(52) U.S. Cl.
CPC . *C12C 13/00* (2013.01); *F17D 1/08* (2013.01); *G05B 15/02* (2013.01)

(58) Field of Classification Search
CPC .................................. F17D 1/08; G05B 15/02
USPC .......................................................... 700/282
See application file for complete search history.

(56) References Cited

U.S. PATENT DOCUMENTS

| | | | |
|---|---|---|---|
| 4,730,651 A | * | 3/1988 | Millet ........................... 141/236 |
| 5,991,815 A | * | 11/1999 | Prater et al. ................... 709/239 |

(Continued)

FOREIGN PATENT DOCUMENTS

| | | |
|---|---|---|
| DE | 10108259 C1 | 1/2002 |
| EP | 1603064 A1 | 12/2005 |

(Continued)

OTHER PUBLICATIONS

Lewis et al. book "Brewing", published in 2001, by Aspen Publishers, Inc.*

(Continued)

*Primary Examiner* — Mohammad Ali
*Assistant Examiner* — Yuhui R Pan
(74) *Attorney, Agent, or Firm* — Marshall, Gerstein & Borun LLP (57) ABSTRACT

A method for the automated control of a pipe network, in particular a brewing plant, for transporting flow media, where the pipe network provides a plurality of transport paths between a source and a target, and where the pipe network comprises a plurality of line sections and/or control modules, and including an automatic calculation of a transport path for a flow medium between a predetermined source and a predetermined target, and where the calculation of a transport path includes the calculation of a sequence of line sections and/or control modules between the source and the target.

25 Claims, 6 Drawing Sheets

(51) Int. Cl.
*F17D 1/08* (2006.01)
*G05B 15/02* (2006.01)

(56) References Cited

U.S. PATENT DOCUMENTS

| | | | |
|---|---|---|---|
| 7,302,958 B2 | 12/2007 | Worczinski | |
| 2004/0075689 A1* | 4/2004 | Schleiss et al. | 345/771 |
| 2004/0123902 A1* | 7/2004 | Worczinski | 137/266 |
| 2009/0088905 A1* | 4/2009 | Parraga | 700/282 |
| 2010/0082145 A1* | 4/2010 | Weatherhead et al. | 700/106 |

FOREIGN PATENT DOCUMENTS

| | | |
|---|---|---|
| JP | 2004162756 A | 6/2004 |
| JP | 2004532621 A | 10/2004 |

OTHER PUBLICATIONS

"Process Control of Brewery Plants" from "Journal of the Chinese Institute of Engineers, vol. 31, No. 1, pp. 127-140 (2008)".*
Notice of Reasons for Rejection for Japanese Patent Application No. 2012-518797 dated Mar. 25, 2014.

* cited by examiner

METHOD FOR AUTOMATICALLY CONTROLLING A PIPE NETWORK

CROSS-REFERENCE TO RELATED APPLICATION

The present application claims the benefit of priority of International Patent Application No. PCT/EP2010/004001, filed Jul. 2, 2010, which application claims priority of German Application No. 102009032547.6, filed Jul. 10, 2009. The entire text of the priority application is incorporated herein by reference in its entirety.

FIELD OF THE DISCLOSURE

The disclosure relates to a method for the automated control of a pipe network, in particular of a brewing plant, for transporting flow media, and to a control device for the automated control of a pipe network.

BACKGROUND

Brewing plants typically comprise a pipe network with a plurality of pipes and branches, the pipes being provided for transporting fluids (that means liquids and/or gases). During a brewing process, the liquids or gases, respectively, are transported between a plurality of containers. For example, products, semi-finished products, raw materials and supplies are transferred from one process cell or one part of the plant to another process cell. For the transport of liquid or gas from a source to a target, a suited transport path must be determined in the pipe network. This transport path corresponds to a sequence of pipe sections through which the fluid is directed from the source to the target.

In many cases, the transport paths are determined in advance for certain previously known fluid transports. During the operation, the previously definitely defined line connections are then established in a pipe network, for example by means of bow connections (hinged elbows), wherein e.g. shut-off valves are used for opening and closing connections. Sometimes, line connections are also established with valves (for example leakage-proof three-way or four-way valves in the form of double seat valves). However, the possible transport paths between a certain source and a certain target are here also fixed in advance.

So, there is a disadvantage of the methods and devices known from prior art in that the transport of flow media is complicated and not very flexible due to the fixed transport paths. Therefore, there is a demand for a method for the automated control of a pipe network permitting increased flexibility.

SUMMARY OF THE DISCLOSURE

According to the disclosure, thus a method for the automated control of a pipe network, in particular a brewing plant, for transporting flow media is provided, wherein the pipe network provides a plurality of transport paths between a source and a target, and wherein the pipe network comprises a plurality of line sections and control modules, comprising an automatic calculation of a transport path for a flow medium between an in particular predetermined source and an in particular predetermined target, wherein the calculation of a transport path includes the calculation of a sequence or succession of line sections and/or control modules between the source and the target.

Since in the control method automated according to the disclosure, a transport path or transfer path for a flow medium is automatically calculated (and thus determined), and no predetermined transport path is used, the control of the pipe network becomes essentially more flexible. The automatic calculation and determination can be accomplished in particular during operation and/or in real time; that means it does not have to be accomplished in advance. The control method permits to consider the state of the pipe network (for example for the process duration of the desired transport or transfer), that means, for example, to consider the use, assignment and/or state of line sections of the pipe network. Thus, sequences of transports or transfers and parallel transports can be performed in an improved manner. The transport paths are in particular variable.

The pipe network comprises a plurality of line sections and/or control modules, such as pumps, valves, and measuring devices, etc. According to requirements and circumstances (for example the current state of the pipe network), the result of the calculation will thus be another sequence of line sections and/or control modules. The calculation of a transport path can thus in particular comprise the calculation of line connections between line sections. The line connections can here be provided, for example, by means of valves.

A line section (that means a part of a pipe or a pipe section) can be limited at one end (or opening) or at both ends each by a control module (for example a valve, a shut-off means or a pump), or by another line section. It can comprise a control module in particular at most or exclusively at its ends. Then, no control module is provided along the line section, except for at its ends. The control module can permit, for example, a fluidic separation of the line section; then, one line section forms the smallest unit of the pipe network that can be fluidically separated. The method according to the disclosure thus permits to assemble a transfer path from small line units and/or control modules, resulting in high flexibility.

The flow medium (fluid) can be a liquid and/or a gas. It can be a product, a semi-finished product, or raw materials and supplies, in particular of a brewing process. The source for the flow medium can be, for example, a process cell (e.g. filter, centrifuge, or the like), an inlet or supply, a tank or a section of the pipe network, for example one or several line sections. The target for the flow medium can be a process cell, a drain, a tank, a gully or a section of the pipe network (for example to enter another process cell), in particular in the form of one or several line sections and/or control modules. Transport or transfer, respectively, can be accomplished, for example, by means of a control module in the form of a conveying element (e.g. a pump) and/or by expulsing the flow medium (by means of a pushing medium). So, with such a pushing medium, a flow medium can be pushed (out) through line sections.

The method can comprise an automatic calculation of a transport path between an individual source and a plurality of targets, between a plurality of sources and an individual target, and/or between a plurality of sources and a plurality of targets. In case of a plurality of sources, flow media from different sources can thus be used and optionally mixed. The possibility of several targets permits to distribute a flow medium to different targets. Therefore, a sequential or a parallel operation is possible. The method can also comprise the calculation of a source and/or a target. The calculation of a source and/or a target can be effected depending on the (predetermined) flow medium to be transported and/or depending on a flow medium currently located in the pipe network. So, for example, a suited source of cleaning liquid can be calculated for a predetermined cleaning liquid.

The calculation of a transport path can be effected depending on the flow medium to be transported and/or depending on a previously (in particular directly previously) transported flow medium, and/or depending on a flow medium currently located in the pipe network. Here, calculation can in particular depend on a flow medium located or previously transported in at least one line section of the transport path to be calculated. The dependency on a flow medium transported in particular directly previously is especially relevant if the transport path of the previously transported flow medium at least partially overlaps a possible transport path (to be calculated) for the flow medium to be transported. So, undesired contamination or mixing of the flow medium to be transported can be avoided. This could occur if a possible transport path comprises a line section via which the previously transported flow medium had been transported. The consideration of other flow media to be transported or being transported permits to transport several flow media on the one hand in parallel (simultaneously), on the other hand successively in line sections, without any cleaning being required, for example in-between, in the latter case.

In the above-described method, at least one status can be allocated to a line section and/or a control module of the pipe network, and the transport path can be calculated depending on at least one status. In particular, at least one status can be allocated to each line section and/or control module of the pipe network.

The at least one status can be a blocking status, a basic status, a medium status, a hygienic status, and/or an allocation status.

The blocking status can indicate whether the corresponding line section or control module is blocked or not blocked (i.e. usable); blocking can be triggered here, for example, by an operator (in particular exclusively by an operator). By this, a line section or control module can be blocked or released manually, where this state of the corresponding line section or control module must then be taken into consideration in the automatic calculation of the transport path.

The basic status can indicate whether the corresponding element is free (i.e. basically usable) or occupied (i.e. in use).

The medium status, which corresponds to product identification, can indicate which flow medium was the last one to be transported via the line section. For example, the calculation of the transport path can be effected under the condition that each line section of the transport path to be calculated comprises a medium status which, according to a predetermined criterion, is compatible with the flow medium to be transported and/or which originates from a number of medium statuses predetermined for the flow medium to be transported.

In particular two medium statuses can be allocated to one line section or control module, a first medium status denoting the current flow medium or the flow medium at present located in the element, and the second medium status denoting a previously transported flow medium. These two medium statuses advantageously permit to calculate a transport path depending on a previously transported flow medium.

The hygienic status can indicate the hygienic state of a line section according to a predetermined criterion. A hygienic status of a line section can in particular be based on one or several flow media previously transported via the line section or at present located in the latter. The hygienic status can moreover have a hygienic expiry time valid for each flow medium which indicates when the hygienic status will become invalid. For example, a list of admissible hygienic statuses can be allocated to each flow medium to be transported, in particular depending on a flow medium located in the line (medium status), so that the flow medium may only be transported along line sections with a hygienic status from the corresponding list; the calculation of the transport path would then be performed under this condition ("product sequence"). Moreover, a hygienic status can be given by a value from an ordered quantity, where the calculation of the transport path is effected under the condition that each line section of the transport path to be calculated comprises at least one hygienic status corresponding to the flow medium. In this manner, undesired impurities, mixtures and/or contaminations of the flow medium to be transported can be avoided. For example, media that are different, though similar as to their product sequence, can be here combined to groups which are then correspondingly configured. Here, configuration efforts can be minimized.

The allocation status can indicate whether a line section is allocated to a transport or transfer and/or which transport is concerned. Here, it is not necessarily relevant whether the allocated transfer is already running or still in a stand-by position.

With the above-described method, the calculation of a transport path can comprise a calculation of at least two partial paths, where the at least two partial paths can be fluidically separated. A partial path can comprise one or several line sections. Fluidic separation can be effected by means of a control module, in particular a shut-off means, for example a valve or a shut-off valve. Such partial paths permit a preparation and/or post-processing of a not used partial path. For example, a not used partial path can be rinsed or cleaned; as an alternative, a partial path that has already been used can be employed for the transport of another flow medium without any further medium consumption due to required expulsions. This involves a saving of time. The calculation of at least two partial paths can in particular comprise a determination and/or calculation of a separation point at which the two partial paths can be fluidically separated.

In the above-described methods, the flow medium to be transported can be transported by means of a pushing medium, that means it can be pushed. The pushing medium (or expulsion medium) can be, for example, water, another product, or a cleaning liquid. The pushing medium is in particular provided at a pushing medium source, for example a water supply point.

The partial paths that can be fluidically separated on the one hand permit in a simple way the further use, preparation and/or post-processing of the other partial paths, and on the other hand the possibility of using different pushing media for different partial paths for transport, and/or of using pushing media from different sources.

The calculation of the transport path can comprise the determination of a pushing medium source near the source according to a predetermined criterion. The calculation of the transport path can furthermore comprise the determination of a drain point near the target according to a predetermined criterion. The predetermined criterion with respect to the proximity can comprise, for example, a maximum distance from the source or the target; here, the maximum distance can in particular be given as maximum number of line sections. In the method, one can also calculate by this, automatically or in an automated manner, how the flow medium to be transported is suitably transported from the source to the target. The drain point can be, for example, a gully.

The mentioned determination of a pushing medium source and/or a drain point can be carried out for one, several, or each of the partial paths. Here, the source to be taken into consideration or the target to be taken into consideration in the proximity of which the pushing medium source or the drain point is to be situated is then the local source or the local target of the partial path, that means the beginning or the end of the partial path. The calculation of partial paths can comprise the calculation of a separation point at which (or in the proximity of which according to a predetermined criterion) a pushing medium source and/or a drain point is provided. In particular if the transport path to be calculated comprises at least two partial paths, the determination of a pushing medium source at the beginning (or in the proximity thereof) and/or the determination of a drain point at the end (or in the proximity thereof) can be carried out for one, several or all partial paths.

For example, for each partial path, a pushing medium source at its beginning and a drain point at its end can be determined. Thus, the flow medium to be transported can be successively transported (expulsed) from the source to the target via the partial paths, wherein optionally other pushing medium sources and/or drain points can be employed for individual partial paths; partial paths via which the flow medium has already been transported can then be used otherwise.

In the above-described methods, the calculation of a transport path can comprise the calculation of a plurality of simultaneously usable transport paths for a plurality of flow media. By this, the parallel transport of flow media is permitted in a simple way. Here, in particular the previously described further developments can be employed for the calculation of each transport path.

The calculation of a transport path can be effected by determining or by avoiding a certain line section, a certain control module or type of control module, and/or a certain measuring device or type of measuring device, such that the calculated transport path comprises or not comprises such a line section, such a control module or such a measuring device, respectively. For example, a certain type of conveying element or a certain measuring device (such as a flow meter or a conductivity meter) can be predetermined as being desired or required, which will then be contained in the calculated transport path. Here, several line sections, control modules and/or measuring devices (or types of them) can be predetermined. If the flow medium is, for example, a cleaning liquid, the line sections to be cleaned and/or the control modules can be moreover indicated in this manner; the method will then calculate a suited path for cleaning, for example in a CIP treatment. Depending on an amount of line sections to be used, a suited forward or return line for the cleaning medium can be searched for in this case. After a certain product transport, an automatic cleaning of the transport path can be in particular carried out. Correspondingly, it can be, for example, also required that a certain type of conveying element or measuring device is not present along the calculated transport path. Moreover, the calculation can be made with the specification that it is irrelevant whether a certain line section, a certain control module and/or a certain measuring device are present in the calculated transport path.

The calculation of a transport path can comprise the determination of a measuring device for an open-loop and/or closed-loop control during transport. Thus, suited measuring devices are automatically obtained which permit a variance comparison for the open-loop and/or closed-loop control in the later transport.

The calculation of a transport path can comprise the calculation, in particular of a transport path, of a preparing and/or post-processing treatment of the pipe network. The preparing or post-processing treatment can be a treatment of one, several or all partial paths of the transport path and/or of one, several or all line sections of the transport path. The treatment can in particular be a treatment required for transporting the flow medium. The treatment can be e.g. filling, emptying, expulsing, rinsing and/or cleaning the transport path, one or several line sections, one or several partial paths and/or one or several tanks, for example at the source and/or at the target. Filling can be done, for example, by means of a pushing medium; rinsing or cleaning can be carried out with a cleaning medium and/or a disinfecting medium, such as a liquid or a gas.

A preparing and/or a post-processing treatment can comprise a transport of a further flow medium, in particular partially or completely, across the calculated transport path for the first flow medium. In case of a further flow medium, the above-mentioned flow medium will be designated here and below as first flow medium. The further flow medium can thus be a preparation medium (for example a pre-rinsing medium), and/or a post-processing medium (for example a post-rinsing medium) for the first flow medium. In other words, the preparing and/or post-processing treatment can comprise a pre-rinsing of at least a portion of the transport path or the complete transport path with a pre-rinsing medium, a removal or expulsion of the rinsing medium by means of the flow medium to be transported, a removal of the flow medium to be transported at least from a portion or the complete transport path by means of a pushing medium, and/or a post-rinsing with a post-rinsing medium.

For the transport of each further flow medium, the method can automatically detect a transport path between a source and a target, where for this in particular the above-described method variants can be used. The method can comprise, for example, an automatic calculation of a transport path for a pre-rinsing medium, a transport path for an expulsion medium for the pre-rinsing medium, a transport path of a pushing medium, and/or a transport path of a post-rinsing medium, each between a corresponding source and a corresponding target. The expulsion medium and/or the pushing medium can be the first flow medium (for example a product, a semi-finished product or raw materials and supplies, for example water). The transport paths for the further flow media can in particular comprise the complete transport path of the first flow medium.

The above-described methods can comprise an automatic calculation of a plurality of transport paths for a sequence of transports of flow media, wherein for each transport path, a sequence of line sections and/or control modules (as described above) is automatically calculated. This sequence can be flexibly modeled in a transfer method. For the following flow media, a sequence of transports of flow media, for example to corresponding sources and targets, can be automatically calculated in particular in the given order: pre-rinsing medium, expulsion medium, first flow medium, pushing medium, post-rinsing medium. In particular, the transport of all media (partially or completely) can here be effected along the transport path of the first flow medium. As an alternative, a plurality of transport paths can be automatically calculated for a sequence of transports of flow media for a cleaning treatment, for example a CIP treatment (cleaning in place). This can be a cleaning treatment of a section of the pipe network, that means one or several line sections and/or control modules, or of a container or vessel.

In particular in a cleaning treatment of a container or vessel, the automatic calculation of a transport path for a flow medium can be triggered by a processor module allocated to the container or the vessel; in the process, the processor module can predetermine the required flow medium or flow media and/or the order of the required flow media. This is advantageous if a container knows "itself" how it has to be cleaned due to the allocated processor module.

The calculation of a transport path can include a new calculation of the transport path, in particular during the transport of the flow medium. By this, for example changes of the state of the pipe network which possibly require a change of the transport path can be taken into consideration and have an influence on the new calculation.

In the methods, the calculation of a transport path can comprise a calculation of a transport path for a flow medium between a first source and a target and a second source and the target, such that the transport from the second source to the target directly follows the transport from the first source to the target. Such synchronization permits a smooth transport from the sources to the target free from interruptions. In this case, for example, the following transport starts when it receives a synchronization signal from the first one. It can then carry out the preparing steps for the second source and draw the product forward to the combined product of the two transfers. When the transfer of the product in the first partial transfer is terminated, the transfer of the second partial transfer smoothly takes over. The first transfer can then simultaneously carry out its post-processing steps. The sources and/or targets can in particular be containers or vessels.

In the methods, the calculation of a transport path can comprise a calculation of a transport path for a flow medium between a source and a first target and the source and a second target, such that the transport from the source to the second target directly follows the transport from the source to the first target. This permits a smooth transport from the source to the targets free from interruptions. The sources and/or targets can in particular be containers or vessels.

Both mentioned cases can also be carried out with more than two sources or targets, respectively.

The calculation of a transport path can include the calculation of control modules for the fluidic separation of the calculated transport path from another region of the pipe network. By calculating control modules by which the transport path can be fluidically separated from another region of the pipe network (e.g. shut-off valves or double seat valves which are not controlled, but through which the medium simply flows), the transport path can be locked. Thus, mixing of the flow medium with other flow media located in the pipe network along the transport path is prevented. These calculated control modules can also be monitored for an alarm (e.g. caused by a line blow), so that in this case, the transfer effected via it can be stopped.

In the above-described methods, each line section and/or control module of the pipe network can be included in an electronic memory in the form of an object. Then, the calculation of a transport path can be carried out based on the objects in the electronic memory. Each object can comprise one or several attributes for the further specification of the object. Possible attributes are, for example, nominal sizes and line lengths of line sections, more specified qualifications of line sections or control modules for certain functions (e.g. yeast transfer), and admissible products, information on control signals of the valve seat and leakage space rinsing, etc. These attributes can be consulted for evaluation when looking for a route; in other words, the calculation of a transport path can be carried out based on one or several attributes. By this, route search can be advantageously carried out with certain criteria (e.g. to avoid nominal size leaps, routes with certain nominal sizes, pumps with certain capacities and/or functions and/or designs, measuring devices with certain functions and/or designs, consideration of one or several Reynolds' numbers resulting for the line sections of the route, etc.) and the routes found by this can be restricted corresponding to the desired requirements. Furthermore, the calculation of a transport path can comprise the calculation of a required quantity of a pushing medium (for example for expulsion), where it can be the quantity required for the complete transport path or only for a partial path. This calculation, too, can be effected taking into consideration attributes allocated to one or several objects.

Several objects can in turn be combined in one (higher-ranking) object. The objects can in particular be included in a database. Due to the allocation of the pipe network elements to such objects, the calculation of the transport path can be easily implemented and carried out on an electronic computer. By the combination, calculation can also be accelerated.

In addition, further elements for conducting, conveying, measuring, discharging and/or accepting a flow medium, in particular measuring means (e.g. flow meters, conductivity meters), process cells (e.g. filters, centrifuges, CIP systems), partial paths, containers, tanks, inlets and/or outlets, can be included each in the form of an object in an electronic memory. The calculation of a transport path can then also be carried out based on these objects.

Each of these objects can moreover comprise one or several attributes for the further specification of the object. Possible attributes in process cells, containers or tanks are, for example, the filling level, the contained medium or product and/or the medium or product to be contained, the parallel usage (whether the corresponding element can be simultaneously used for several different transports), requirements or compatibility demands on line sections to be used with the element, control modules, sources, targets and/or other elements of the pipe network, readiness for filling, emptying or cleaning, and the information whether a process cell is connected with a predetermined line section, control module and/or other elements of the pipe network via a shut-off element. These attributes can be consulted for evaluation when looking for a route; in other words, the calculation of a transport path can be carried out based on one or several attributes.

At least one status parameter can be allocated to each object, in particular to each line section and/or each control module. This status parameter can be a blocking status parameter, a basic status parameter, a medium status parameter, a hygienic status parameter, and/or an allocation status parameter. These parameters identify the above-described status of a line section or of a control module. For example, a first and a second medium status parameter can be allocated to an object. The status parameters can be given in the form of alphanumerical data. They can assume, for example, values from an ordered quantity.

All steps of the above-described methods can be carried out automatically, i.e. in an automated manner.

The above-described methods can furthermore comprise an automatic control of the pipe network according to the calculated transport path or according to the calculated transport paths. In this manner, not only the calculation of the transport path, but also the performance of the transport is effected in an automated manner. The control can be in particular effected such that the line sections are connected according to the calculated transport path. This connection can be effected, for example, by means of valves and/or shut-off means which are correspondingly controlled.

The control of the pipe network cannot only be effected such that a transport of the flow medium along the calculated transport path is carried out, but also such that an optionally calculated preparing and/or post-processing treatment of the pipe network, in particular along the transport path, is carried out. Moreover, the automatic control can comprise a control of the required control modules (such as valves or conveying elements); in particular, the control can be effected such that a required pushing medium is provided.

The pipe network can be in particular controlled such that a transport of a flow medium between a first source and a target and a second source and the target is effected such that the transport from the second source to the target directly follows the transport from the first source to the target. The pipe network can also be controlled such that a transport of a flow medium is effected between a source and a first target and the source and a second target, such that the transport from the source to the second target directly follows the transport from the source to the first target. More than two sources or targets, respectively, are also possible in this connection.

A pipe network can also be controlled, for example, such that a transport of a flow medium between two (or more) sources and one target is effected such that the transport from the sources to the target takes place simultaneously. By this, mixing of the source media can be achieved. Here, the control can be effected according to a predetermined mixing ratio of the media from the sources. It is also possible that the transport from a further source to the target directly follows the transport of the first source to the target. It is also possible that a source is provided as compulsory member of a transport. So, if such a compulsory source does no longer transport any medium to the target, the transport from all other sources is also stopped.

The control modules of the calculated transport path can be allocated to function groups according to predetermined criteria (e.g. path elements, source outlet valves, target inlet valves, conveying elements, clock elements, etc.). The control of a control module can then be effected by means of a predefined control or activation of the corresponding function group. The predefined control or activation can be in the form of a given sequence of function groups to be controlled or to be activated, respectively. The given sequence can also comprise given time intervals for the control or activation of the function groups. Such a predefined control permits abstract programming of the basic activation of control modules (that is via the function groups) for a certain type of transport, where this programming can be effected independent of the control modules actually used in the individual case due to the calculated transport path. For example, a sequence of function groups to be controlled can be pre-defined or programmed, respectively, before the transport of a certain flow medium and each preparing and/or post-processing step.

Furthermore, a distinction can be made, for example, between a transport group and a secondary transport group. The transport group indicates the active conveying elements for the respective transport; these are actively involved in the transport. The secondary transport group indicates the permitted passive (that means not actively involved) conveying elements or the conveying elements operating with a changed control direction compared to the transport group.

In the above-described methods, the automatic control of the pipe network can be effected using an automatically determined measuring device, wherein a variance comparison is carried out with the measuring device. The result of the variance comparison can be used for the open-loop and/or closed-loop control of control modules.

The above described methods can furthermore comprise an automatic control of the pipe network, so that a calculated transport path is fluidically separated from another region of the pipe network. It is thus prevented that a flow medium to be transported gets into ("not permitted") line sections or control modules of the pipe network outside the transport path, or that another flow medium gets into the transport path. The control modules responsible of the fluidic separation can also be monitored for an alarm (e.g. caused by a line blow), so that in this case, the transfer effected via it can be stopped.

In the above-described methods, the calculation of the transport path and/or the control of the pipe network can be based on a state parameter of the source and/or the target. As a status parameter, for example the filling level, a fault parameter (whether a fault has occurred or not), an urgency or priority parameter, the life cycle, the contained medium or product and/or the medium or product to be contained, an abortion parameter and/or one or several of the above mentioned statuses are possible.

The source and/or the target can emit a value of a status parameter, in particular to a control device for the automated control of the pipe network. In this manner, a source or a target can have an influence on the transfer. A transport path to be calculated can take into consideration the already emitted status parameters, an already calculated transport path can be modified and/or calculated again on the basis of the emitted status parameters. As an alternative or in addition, the control of the pipe network can be influenced and/or modified based on the emitted value of one or several status parameters.

The described methods can furthermore comprise recording a calculated transport path and/or controlling the pipe network.

The disclosure furthermore provides a computer program product, comprising one or several machine-readable media with instructions which are designed to cause a computer or a processor to carry out one of the above-described methods. The methods can thus be embodied to be implemented in a computer.

Moreover, the disclosure provides a control device for the automated control of a pipe network, in particular a brewing plant, for transporting flow media, wherein the pipe network provides a plurality of transport paths between a source and a target, and wherein the pipeline network comprises a plurality of line sections and control modules, wherein the control device is designed for the automatic calculation of a transport path for a flow medium between an in particular predetermined source and an in particular predetermined target, wherein the calculation of a transport path includes the calculation of a sequence of line sections and/or control modules between the source and the target.

The control device can in particular be designed corresponding to the above-described methods. The control device can in particular comprise a computer or a computer system.

BRIEF DESCRIPTION OF THE DRAWINGS

Further advantages and features of the disclosure will be described below with reference to the figures. In the drawings

DETAILED DESCRIPTION OF THE PREFERRED EMBODIMENT

Figure 1:
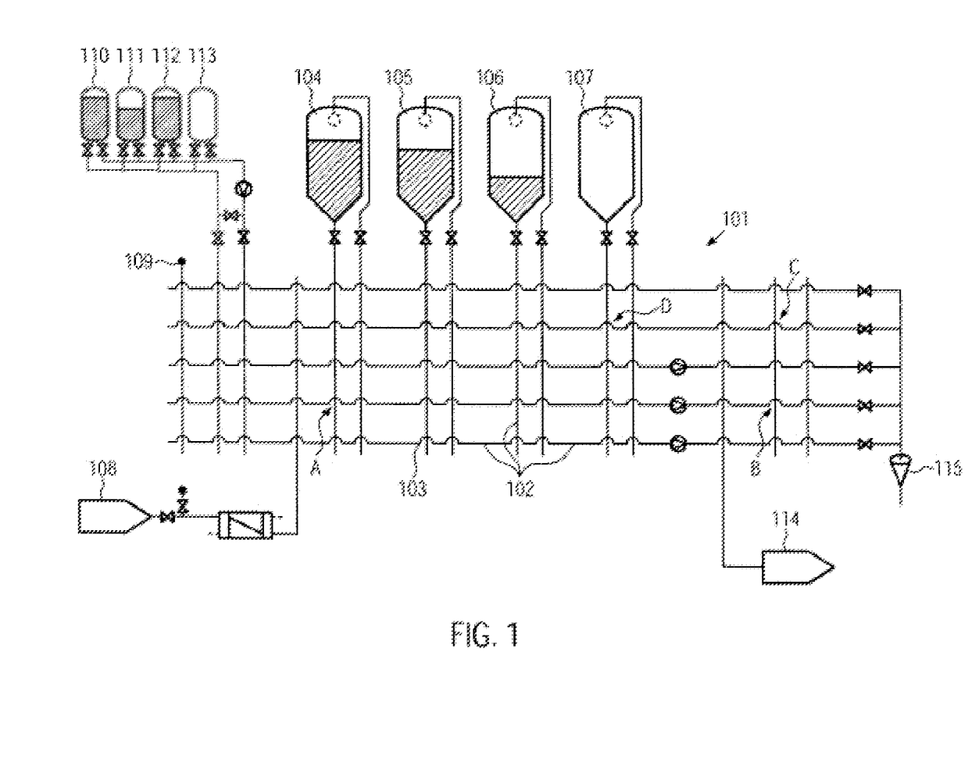
FIGS. 1 to 5 show examples of various states of a pipe network for transporting flow media.

FIG. 1 shows the simplified example of a pipe network of a brewing plant as it can be found, for example, in a fermenting room and/or a storage cellar. The pipe network 101 comprises a plurality of pipelines or line sections 102. At the crossing points of two pipes, valves 103 are provided, for example leakage-proof three- or four-way valves in the form of double seat valves. Between two adjacent crossing points or valves, line sections are thus provided, where the adjacent line sections can be fluidically connected or separated by a corresponding adjustment of the valves at the crossing points.

It will be understood that the disclosure is not restricted to a brewing plant but is also suited for the transport of other liquid or gaseous flow media.

The pipe network is connected to four tanks 104 to 107. These tanks are intended for receiving liquids (products) which are transported through the pipe network 101. The liquid can be, for example, wort or green beer.

The pipe network is connected to a brewhouse 108 which supplies the wort for the tanks. Furthermore, a water inlet 109 for supplying the pipe network with water is provided.

The vessels 110 to 113 are part of a CIP system (cleaning in place) and contain the corresponding liquids, such as caustic, acid, disinfectant. An outlet of the pipe network leads to a filtration means 114. Furthermore, a drain in the form of a gully 115 is provided.

Starting from the state shown in FIG. 1, a transport path or transfer path of a product from the tank 104 (source) to the tank 107 (target) is to be calculated by way of example in an automated manner. The product corresponds to the above mentioned first flow medium for the transport of which preparing and post-processing steps are carried out with further flow media.

In the illustrated example, this calculation is carried out in a control device for the pipe network 101 which comprises a computer. In the computer, the various elements of the pipe network (line sections, shut-off means, valves, pumps, measuring devices, such as flow meters and conductivity meters, containers, tanks, inlets, outlets, complete process cells (such as filters, centrifuges, etc.) and/or partial paths) are stored as individual objects. Moreover, the connection of the individual objects to each other is stored. Storing can be done, for example, in a database.

Here, an object has various status parameters by means of which different properties of the element are indicated. For example, one or several medium status parameters can be allocated to a line section object or a valve object. This parameter corresponds to a product identification and indicates which flow medium, that means in the present example which product, is at present located in the corresponding element of the line network, that means, for example, in the line section. A second medium status parameter can also be allocated to the object and indicate which product was previously located in the corresponding line section.

As a further status parameter, a hygienic status parameter can be allocated to an object. This can assume, for example, the values "contaminated", "clean" or "sterile". Other or additional values are also possible. For each flow medium or product, a set of admissible values of the hygienic status parameter can be indicated, for example in a table, depending on a medium located in the line. For example, only the value "sterile" may be indicated for a flow medium M1 as admissible hygienic status parameter with respect to the medium M3 located in a line section; for another flow medium M2, the admissible values "clean" and "sterile" can be indicated. Thus, the flow medium A may only be transported through line sections with medium M3 which have the hygienic status "sterile", while the flow medium M2 may be transported through "sterile" and "clean" line sections. For example, different media which are, however, similar as to their product sequence, are here combined to groups which are then configured correspondingly. By this, configuration efforts can be minimized. Basically, the hygienic status can have a hygienic expiry time valid for each flow medium which indicates when the hygienic status will become invalid. After the hygienic expiry time has been reached, a corresponding flag ("Expired Flag") will be set, for example.

According to an alternative, the hygienic status parameter can assume e.g. the following values: "line section contains product" (i.e. in the evaluation of the medium status, the currently contained medium is evaluated), "line section contains the expulsion medium" (in the evaluation of the medium status, the currently contained medium and the precursor medium are evaluated), "cleaned" (line section was cleaned, the line section contains the expulsion medium, the precursor medium is not relevant), "CIP not cleaned" (CIP in operation, the line section contains CIP medium, the precursor product is not relevant), "clear rinsed" (line section was rinsed, i.e. in the evaluation of the medium status, the currently contained medium as well as the precursor medium are evaluated), "sterilized" (line section contains the expulsion medium and is sterilized, i.e. it can be used for anything), and "disinfected" (line section contains the expulsion medium and is disinfected, i.e. it can be used for anything).

In addition, a blocking status parameter can be provided which indicates whether the corresponding line section or control module is blocked or not blocked (i.e. usable); here, blocking can have been triggered by an operator. If a line section that was just used is blocked, only a blocking reservation is recorded. In this case, a line section designated in this way would no longer be used in the automatic calculation of a transport path, but a transfer currently operated via it would not be influenced.

Furthermore, a basic state parameter can indicate whether the corresponding element is "free" or "in use". A basic state parameter "free" accordingly means that the product and the hygienic status are known and the line is not contaminated. A basic state parameter "in use" means that a flow transport is taking place on the line section and the product and the hygienic status are currently in a transition state. This means that a utilization of the hygienic state or the medium status is not possible in this case. Further possible values for basic states are, for example "undefined" (control device or computer system does not know the actual state), "contaminated" (a shut-off valve was e.g. pushed open by a pressure blow), and "aborted" (a transfer was aborted without carrying out post-processing steps). In this case, the utilization of the hygienic status or the medium status is not possible (and neither necessary).

A further status parameter can be an allocation status parameter which represents, for example, a transport identification or a performed transport or a transport to be performed.

It can be furthermore indicated in a table which flow media or products may be transported after which other flow media or products in a certain element of the pipe network. It can be indicated, for example, that beer of a certain type may only be transported after beer of the same type or after water. For example, beer of a certain type could also be transported after beer of another type. Thus, a predetermined medium sequence or product sequence results. In this connection, the hygienic status can also be taken into consideration. It can be indicated, for example, that beer B1 may only follow beer B2 with a hygienic status "cleaned". It can also be indicated that beer B2 may follow beer B1 with a hygienic status "cleaned" and "expulsed".

The control device basically automatically calculates the sequence of transport paths which is required, including the preparing and post-processing steps, to transport a first flow medium (product) from a certain source to a certain target. The preparing transfers can be, for example, "pre-rinsing with water" and "expulsing the water with product". Then, the actual product transport (main transfer) follows. The post-processing steps can be "pushing the product with water" and "post-rinsing with water". In each of these individual transports, a connection between a source and a target is established in each case. In the main transfer, the (product) source is directly connected to the (product) target, in "pre-rinsing with water", for example, a water supply close to the source is connected to a gully connection close to the target, in "expulsing the water with product", the source is connected with a gully connection, for example, close to the target, in "pushing the product with water", a water supply, for example, close to the source is connected to the target, and in "post-rinsing with water", a water supply, for example, close to the source is connected to a gully connection, for example, close to the target. All preparing and post-processing steps preferably contain the path of the main transfer. The above-mentioned source/target relations can in particular be separated again in the preparing/post-processing steps at separation points. As an alternative to the water supplies close to the source and the gully connection close to the target to be determined in each case anew, these can also be fixed.

In the calculation of the transport path from the tank 104 to the tank 107, the control device takes various factors into consideration. In the example described here, the calculation is first based on the flow media transported in the corresponding line sections or valves, respectively. If after a liquid transport, the transport path is not cleaned, the corresponding sections are contaminated by the transported flow medium. Depending on which flow medium now is to be transported, certain product sequences are admissible or not in view of a flow medium transported before it. This results in restrictions in view of the line sections and valves usable for this transfer. The contaminations admissible for a certain flow medium due to previously transported flow media can be stored electronically, for example in one or several tables. The control device will then, in the calculation of the transport path, determine which line sections or valves are admissible based on these tables and the flow medium to be transported.

Another factor to be taken into consideration by the control device is the hygienic status of the possible elements of the pipe network. Here, too, it can be stored, for example, in a table which flow medium requires which hygienic status in the line sections and/or valves to be used. Correspondingly, referring to the table, the control device will check which elements of the pipe network are admissible for the flow medium to be transported. Depending on the hygienic status, the evaluation of the medium identification parameters can be omitted (e.g. in case of hygienic status CIP).

If certain elements of the pipe network have been blocked, for example by an operator, a blocking reservation ("use status") is present, the elements are, according to the basic status parameter, already in use, "undefined", "contaminated" or "aborted", or these elements have been already allocated by another transfer, these elements are not taken into consideration by the control device in the further calculation of a transport path.

Based on the various given basic conditions, the control device in the present case calculates a transport path leading from the tank 104, via the crossing points A, B, C, and D, to the tank 107. Depending on the state of the pipe network, the calculation of this transport path can moreover comprise the calculation of a preparing treatment, for example the selected line sections and control modules. This preparing treatment can be, for example, a CIP cleaning or an expulsion of a present liquid.

After the search for a route, the line sections and control modules required for the route are known. These are allocated to so-called function groups or control groups (for example, in the function group, "path elements" are all those control modules responsible for directing the path, in the function group, "conveying elements" are all those control modules responsible for transporting the medium; further function groups would be e.g. source outlet valves, target inlet valves, elements to be clocked for e.g. valve seat lifting or valve seat rinsing, elements to be locked or monitored, conveying elements, equipment modules, e.g. coolers, pressure holding combinations, centrifuges, etc.). The allocation of the control modules located on the route to the various function groups is on the one hand based on the type of objects (also on the attributes already mentioned above which can be present in the object), and on the other hand on the position within the route (e.g. the first valve located on the route is treated as source outlet valve after the source tank).

In addition, certain parameters can be defined for a transport. These parameters serve to influence the respective transport (e.g. volume flow rate, temperature, pressure, quantity, etc.). During the transfer, the respective desired and actual values (variance comparator module) are indicated and can be changed in real time. In the route search, measuring devices of these values can be automatically allocated to variance comparators. The result of a variance comparator can be used as a stepping condition or another control criterion within a transfer step (i.e. a concrete source/target combination within a transfer process).

The control device can thus preferably only be programmed via the function groups. This means that the program does no longer control any actuators directly but indirectly via the function groups. For example, a rise-delay time or a turn-off delay can be moreover passed to each function group. Thus, the activation or termination of the elements contained in the group is only effected after the parameterized time has expired (e.g. to avoid line blows). Other criteria (e.g. falling below a volume flow rate) can also influence the activation or termination of the elements contained in one group. One possible sequence of commands would be:

Open source outlet valves
Open target inlet valves
Open directional valves
Conveying elements on (with time delay)

This means that it is not known during the program creation of the control device which control modules are exactly controlled. This information is communicated to it during the running time via the function group.

There are also control groups for leakage rinsing, seat lifting as well as gullies. During line cleaning, these controls must be clocked. By the corresponding configuration of the line network on a database level, these elements can also be passed to the corresponding group (gully, leakage room rinsing, seat lifting) after completed route search. Thus, a clocking of valves does not have to be explicitly programmed in this case. The corresponding groups only have to be controlled clock-wise (pulse/idle times can be stored at the group or at the found control modules).

In the route search, certain parameters are also passed according to which, for example, conveying elements of a certain type have to be located on a calculated transport path or must not be located on the latter.

Generally, a distinction can be made, for example, between a transport group and a secondary transport group. The transport group indicates the active conveying elements for the respective transport; these are actively involved in the transport. In the transport group, various operators (for example "no element" (this can e.g. correspond to the indication "=0"), "exactly one element" ("=1") and "no or one element" ("<=1") can be stored; this means that no, exactly one or at most one conveying element may be situated in the transport group. Equally, the position of the corresponding element (e.g. "first element" or "last element") and optionally the type of the element can be configured. The secondary transport group indicates the permitted passive (that means not actively involved) conveying elements, or the conveying elements operating with a changed control direction compared to the transport group (e.g. transport group controls volume flow rate, secondary group controls pressure); here, there are also various operators (for example "no element" (e.g. by the indication "=0"), "exactly one element" ("=1"), "no or one or several elements" (">=0"), or "at least one element" (">=1")). So, if the transport group comprises the operator "exactly one element", and the secondary transport group comprises the operator "at least one element", the transport path must have exactly one active conveying element and at least one passive conveying element. By the combination of the operators in both groups, thus the presence of conveying elements can be decidedly defined, allocated and controlled. In addition to the group of conveying elements, groups for other active elements, such as cooler, pressure holding combinations, centrifuges, etc., are also possible.

The calculation of the transport path and/or the control of the pipe network can be based on a status parameter of the source and/or the target which is in particular sent to the control device. Status parameters can be, for example, the filling level, a fault parameter (whether a fault has occurred or not), an urgency or priority parameter, the life cycle, the contained medium or product and/or the medium or product to be contained, and/or one or several statuses. In this manner, the sources/targets can have an influence on a transport depending on their own status.

Thus, it can be signaled to the control device that at present no product is available, or that e.g. the source is having a fault. The control device can then switch off, for example, the corresponding conveying elements for a running transfer.

By means of a priority parameter, or else a life cycle, a process cell can signal how "urgently" transfer is required. One can achieve with this that sources having the longest life cycle or a higher priority value will be emptied earlier than sources having a shorter life cycle or a lower priority value. For example, the priority of a target can rise gradually since the last cleaning.

With an abortion parameter, an element involved in the transfer (e.g. a target) can demand that the transfer process be cancelled. In this case, the main transfers must be, for example, terminated, possibly currently running preparing or post-processing steps must be completed (e.g. because a tank switch-over is being prepared). The latter ensures that in this case the line system is in a well-defined state after the completion of the transfer.

The sources and targets can moreover signalize which product they are containing or whether they are prepared for filling, emptying or cleaning, respectively. Moreover, they can signalize a requirement or desired compatibility of other elements of the pipe network. This requirement or compatibility can also be stored for a certain transfer process (for example in the respective source/target lists). This designates that this process can only be carried out with sources or targets, respectively, that meet this requirement or compatibility. If, for example, a fermenting tank emits "rinsed" or "cleaned", only processes correspondingly designated with "rinsed" or "cleaned" can be carried out with it.

By this, an operator can only carry out transfers or select sources and targets which also technologically match. In the all-automatic operation, moreover e.g. a source can request a certain transfer. From the corresponding data (requirements, compatibilities on possible targets and transfer processes, product information, information on the readiness for filling/emptying/cleaning), transfer methods and targets coming into consideration can be determined.

One can also store, as an attribute to the objects of the available process cells, whether these can be e.g. used by several independent transfers in parallel, such as a transfer of tank contents to a filling line and a simultaneous transfer of the same tank to another filling line.

Another attribute can indicate whether or not a process cell is connected to a predetermined element of the pipe network (for example a line section) via a shut-off element. If this is not the case, this element cannot be taken into consideration in the route calculation.

In methods which carry out mixing of media, it can be necessary to observe certain mixing ratios. For this, a certain mixing ratio for such processes can be stored depending on the number of sources involved. It can moreover be indicated for sources whether these are compulsory or optional members.

A compulsory member here always has to contribute its corresponding proportion. If a compulsory member does no longer transport any product to the target, all other sources involved must stop (whether they are compulsory or optional). If an optional member does no longer transport any medium to the target, then only the corresponding mixing ratios are adapted, while transfer is continued. In the illustrated example, the calculated transport path leads to a sequence of steps to be performed and corresponding controls of the pipe network which have also been determined by the control device in the course of automatic calculation. These steps will be illustrated more in detail below with reference to FIGS. 2 to 4.

Figure 2:
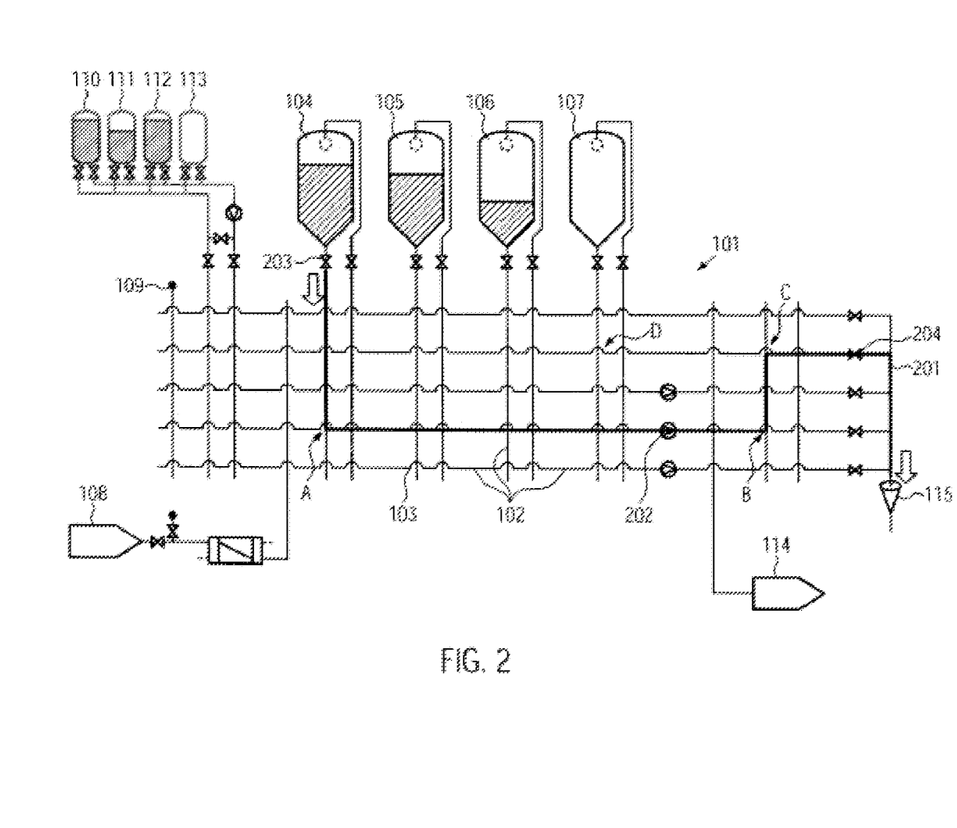

As is shown in FIG. 2, in a first step, the line is expulsed with the flow medium to be transported along the transport path 201 to the gully 115. For this, the control device had determined the corresponding control of the required valves and pumps which are now correspondingly controlled in an automated manner. During expulsion, the status parameters of the line sections and control modules involved are set to the current value. The current medium identification parameter consequently assumes a value corresponding to the transported flow medium, the hygienic status is set, for example, to "line contains product", the basic status parameter is set to "in use". For this, the control modules (valves) at the points A, B, C and the pump 202, the source outlet valve 203 and the gully valve 204 are activated.

Figure 3:
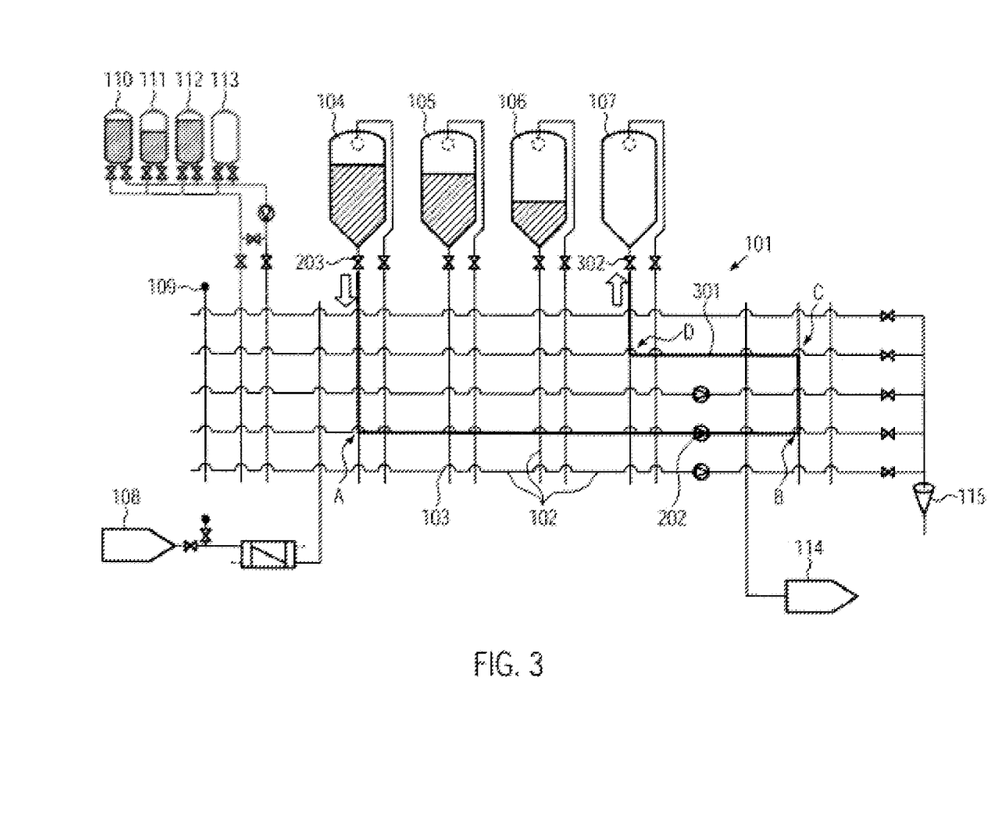

After expulsion, the flow medium is, as is shown in FIG. 3, pumped from the source tank along the transport path 301 to the target. In this step, too, a corresponding adaptation of the status parameters of the elements of the pipe network involved takes place. For this step, the control device had determined a corresponding activation of the valves at points A, B, C and D and the pump 202, the source outlet valve 203 and the target inlet valve 302, leading to a corresponding automated activation of these elements.

Figure 4:
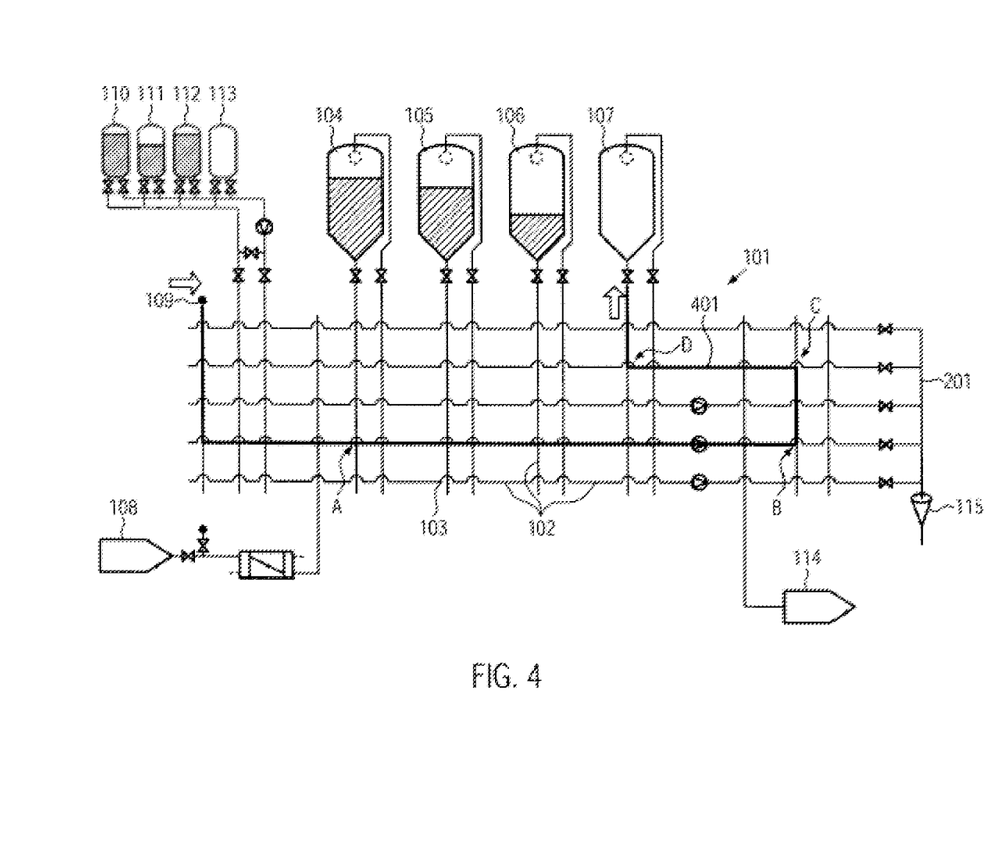

Next, as is shown in FIG. 4, water is pushed behind in the line along the transport path 401 to the tank. Here, again, the corresponding status parameters are set. The amount of water to be used can be calculated e.g. by evaluating the corresponding line attributes.

Figure 5:
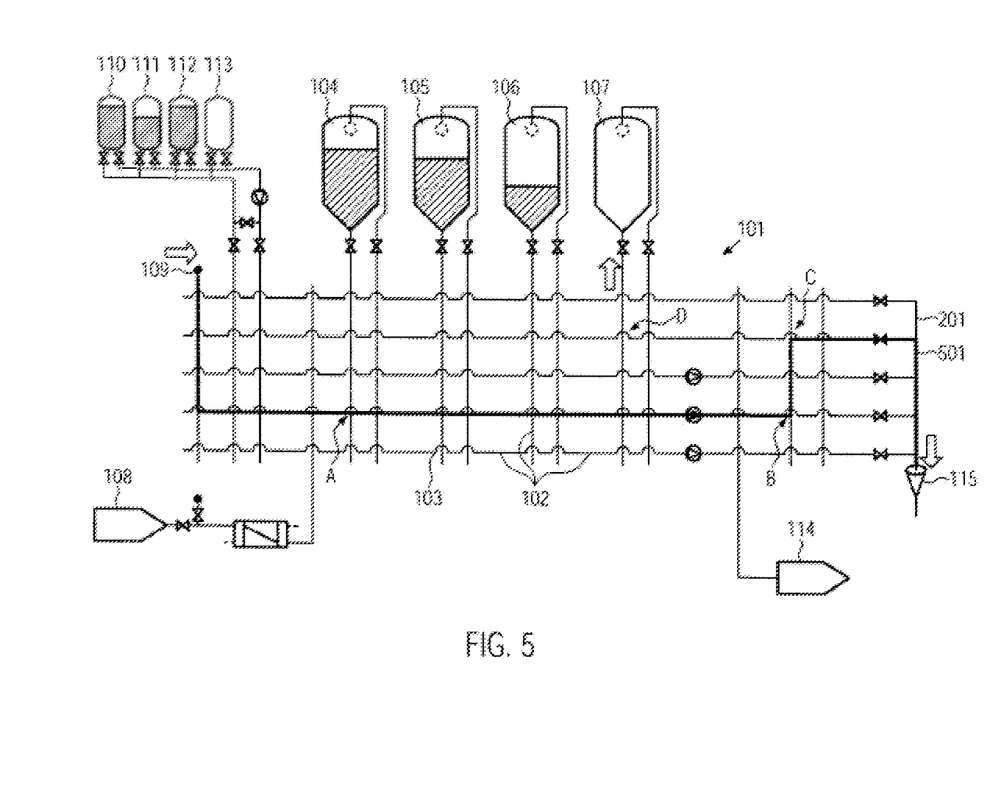

In a last step, as is shown in FIG. 5, the line is at least partially rinsed along the transport path 501 with water to an outlet, that is to a gully.

In this simplified example, the preparing and post-processing steps are not carried out for all line sections of the main transfer path. In many cases, it will be required, however, to carry out these steps along the complete main transfer path.

As can be taken from this example, the control device calculates the transport path automatically, wherein the control of the involved elements is automatically determined in the correct chronological sequence. The transport paths for post-processing steps as well as a pushing behind and/or rinsing with water as well as the time intervals for the complete control of the elements are determined automatically. The allocation of the line sections and control modules for the post-processing steps will be advantageously carried out only at a point in time during the main transfer in order not to unnecessarily block partial pipe systems for the duration of a main transfer normally taking more time. During the calculation and/or control of the pipe network, logging can be carried out.

During a flow transport, the line sections involved must be fluidically separated from the outside, i.e. from the rest of the pipe network, that means they must be locked, to prevent the transported flow medium from leaving the transfer path or flow media from getting into the transfer path from outside. According to a first example, a locking table can be stored for each control module which contains locking information for each adjacent line section. The locking information can assume, for example, integral values which in particular correspond to a flow transport identification. With a value 0, the access to the corresponding line section would then not be locked. As soon as the value is unequal 0, that means it contains a flow transport ID, the corresponding line section is locked.

According to an alternative example, it can be determined, after the control modules depending on the calculated route have been analyzed, which control modules fluidically separate this route to the outside. These control modules are included in the function group for locking. They can then no longer be controlled (i.e. opened) from outside. The thus calculated control modules can furthermore be monitored for any alarm signals. In this case, the transfer running through them can be immediately stopped.

Basically, control modules which are in particular not already allocated (and thus occupied) or locked, can be set to manual operation and be operated manually. The status model in the database with the corresponding status parameter values will then be correspondingly updated. Manually controlled control modules would then not be used in the automatic calculation of a transfer path through the control device.

In a transfer of a product from a source to a target or in line cleaning, the main transfer of this first flow medium and the required preparing and post-processing transfers are calculated by the control device and the corresponding line sections are allocated. In vessel cleaning, however, a processor module can be allocated to the vessel which knows the flow media and their sequence of application required for vessel cleaning. For example, the vessel needs for each cleaning step a certain flow medium from the CIP system. Thus, the processor module directs a request to the control device to provide the required flow media predetermined by the processor module. Initiated by this request, the control device then calculates the corresponding transport paths for the required flow media.

Figure 6:
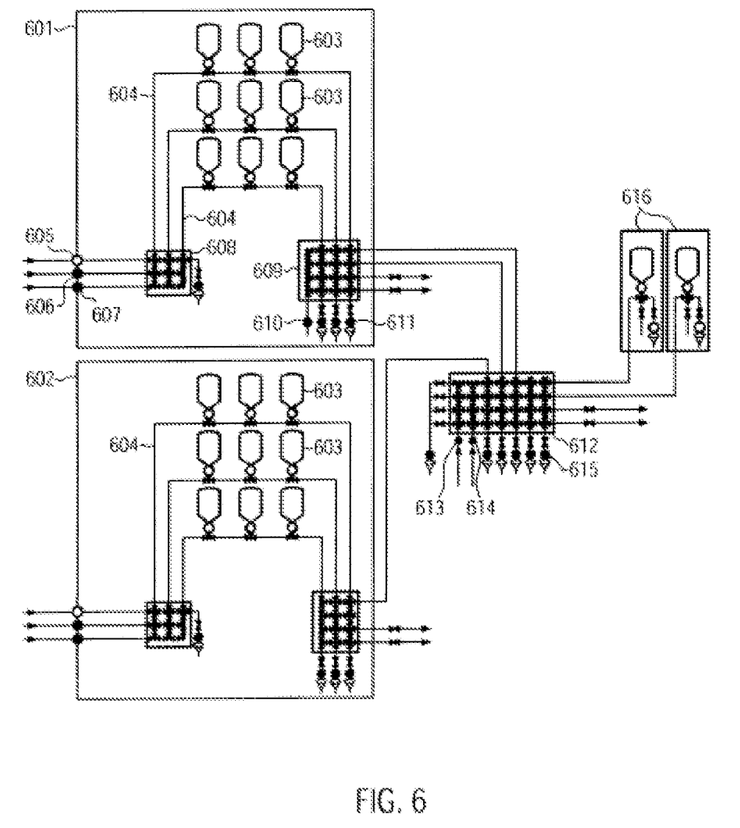
FIG. 6 shows another example of a pipe network.

Another example of a pipe network is illustrated in FIG. 6. Here, two tank rooms 601 and 602 are shown which each comprise a plurality of tanks 603 (corresponding to the tank lines 604). Each tank room comprises a product inlet 605, a water supply 606 and a CIP supply 607.

These three inlets lead to a filling matrix with twelve line sections and moreover four directional valves. The product supply 605 is connected to the brewhouse which supplies the wort for the tank room.

The three tank lines each pass three tanks and lead to an emptying matrix 609. One or several product outlets/exits, one outlet to the yeast cellar, and a CIP outlet lead out of the tank room. In addition, the emptying matrix of the upper tank room comprises a water supply 610 and three outlets 611 to corresponding gullies.

The product lines of the two tank rooms are guided to a mutation matrix 612 in which the products can be mixed. The mutation matrix comprises a water supply 613, a CIP supply 614 and several gully drains 615. Lines lead from the mutation matrix to filtration means 616.

The various matrices permit to determine transport paths with separable partial paths which advantageously permits sequential transporting and processing, in particular during the preparing and post-processing steps. For example, a transport of the liquid located in the last tank of the uppermost row to one of the filtration means 616 can be carried out along a plurality of partial paths. Here, (simultaneously with preparing transfers) in particular the contents of the tank is emptied to the emptying matrix 609 and expulsed with water; for the latter, the water supply 606 is employed. The valve located at the upper right in the emptying matrix 609 serves as separation point between the first partial path and the second partial path.

After expulsion into the emptying matrix, this valve is closed to the tank line 604, so that the product is located in the emptying matrix and the adjacent line sections fluidically separated from the tank line. By this, the emptying matrix forms a separation point for a separable partial path. To forward the product to the mutation matrix, pumping and expulsion with water are performed, where now the water supply 610 is employed. Since the tank line 604 is fluidically separated, this line section can here be immediately used again, for example for cleaning.

Correspondingly, the line between the emptying matrix 609 and the mutation matrix 612 can also be fluidically separated from the line leading further from the mutation matrix. Thus, here, too, the product can be completely transferred to the mutation matrix and pushed by it into the filtration means 616 by means of the water supply 613.

In the mutation matrix 612, flow media can be mixed. For this, the corresponding information can be stored in a suited data structure which names the products to be mixed and the final products resulting from them.

For the transport along these three partial paths, the control device can determine separate partial sources and partial targets each (e.g. water supplies and gullies) which then result in a corresponding control of the elements of the pipe network. During transport along a partial path, this partial path can in particular also be separated to the outside, that means from the supplying and discharging lines.

The control device can moreover automatically calculate an automatic tank switch-over. This can be effected in case a target tank is full and is then changed over to a further target tank. On the side of the source, one can also switch over to a second source tank, for example after emptying a first source tank. For this, two partial transports to be carried out at least partially in parallel (including preparing and post-processing steps) can be calculated. Here, synchronization mechanisms can be employed to synchronize the various partial transports. In this case, the second transport starts, for example, when it receives a synchronization signal from the first one. Then, it can carry out the preparing steps for the second source and draw the product to the merging point (which normally is a separation point) of the two transfers. When the transfer of the product in the first partial transfer is terminated, the transfer of the second partial transport takes over smoothly (subsequent tank).

The invention claimed is:

1. A method for the automated control of a pipe network for the transport of flow media, wherein the pipe network provides a plurality of transport paths between a source and a target, and wherein the pipe network comprises one of a plurality of line sections, control modules, and a combination thereof, comprising:
   automatic calculation, in a control device, of a transport path for a flow medium between a predetermined source and a predetermined target, wherein the calculation of a transport path comprises a calculation of a sequence of one of line sections, control modules, and a combination thereof between the source and the target,
   wherein the flow medium to be transported is pushed by means of a pushing medium, wherein the pushing medium is in particular provided at a pushing medium source, and the calculation in the control device of the transport path comprises a determination of a pushing medium source in the proximity of the source according to a predetermined criterion, the predetermined criterion comprising a maximum distance from the predetermined source or the predetermined target to the pushing medium source,
   wherein the calculation in the control device of a transport path comprises a calculation of a preparing treatment of the pipe network and/or a post-processing treatment of the pipe network,
   wherein the preparing treatment and/or the post-processing treatment comprises a pre-rinsing of at least a portion of the transport path with a rinsing medium, a removal of the rinsing medium by means of the flow medium to be transported, a removal of the flow medium to be transported at least from a portion of the transport path by means of the pushing medium, and/or a post-rinsing with a rinsing medium.

2. The method according to claim 1, wherein the calculation in the control device of a transport path is effected depending on one of the flow medium to be transported, a flow medium transported before it, a flow medium located in the pipe network, and a combination thereof.

3. The method according to claim 1, wherein at least one status is allocated to one of a line section, a control module, and a combination thereof, and the calculation in the control device of a transport path is effected depending on at least one status.

4. The method according to claim 1, wherein the calculation in the control device of a transport path comprises a calculation of at least two partial paths, wherein the at least two partial paths can be fluidically separated from each other.

5. The method according to claim 4, wherein the calculation in the control device of a transport path comprises a determination of an outlet point near the target according to a predetermined criterion.

6. The method according to claim 1, wherein the determination is carried out for each partial path.

7. The method according to claim 1, wherein the calculation in the control device of a transport path comprises a calculation of a plurality of simultaneously usable transport paths for a plurality of flow media.

8. The method according to claim 1, wherein the automatic calculation in the control device of a transport path for a flow medium is triggered by a processor module allocated to a container or a vessel.

9. The method according to claim 1, wherein the calculation in the control device of a transport path is effected by one of predetermining or avoiding one of a certain line section, a certain control module, a certain measuring device, and a combination thereof, such that the calculated transport path one of comprises or not comprises such a line section, such a control module or such a measuring device.

10. The method according to claim 1, wherein the calculation in the control device of a transport path comprises the calculation of a transport path for a flow medium between a first source and a target and a second source and the target, such that the transport from the second source to the target directly follows the transport from the first source to the target.

11. The method according to claim 1, wherein the calculation in the control device of a transport path comprises a calculation of control modules for fluidic separation of the calculated transport path from another region of the pipe network.

12. The method according to claim 1, wherein each line section and/or control module of the pipe network is included in the form of an object in an electronic memory.

13. The method according to claim 12, wherein at least one status parameter is allocated to each object, wherein the at least one status parameter is one of a blocking status parameter, a basic status parameter, a medium status parameter, a hygienic status parameter, an allocation status parameter, and a combination thereof.

14. The method according to claim 1, furthermore comprising an automatic control of the pipe network according to the calculated transport path.

15. The method according to claim 14, wherein the control modules of the calculated transport path are allocated to function groups according to predetermined criteria, and wherein the control of a control module is effected by means of a predefined control of the corresponding function group.

16. The method according to claim 1, wherein the calculation of the transport path in the control device and/or the control of the pipe network is based on a status parameter of one of the source, the target, and a combination thereof.

17. The method according to claim 16, wherein the source and/or the target emit a value of a status parameter.

18. The method according to claim 1, wherein the pipe network is in a brewing plant.

19. The method according to claim 3, wherein the at least one status comprises one of a blocking status, a basic status, a medium status, a hygienic status, an allocation status, and a combination thereof.

20. The method according to claim 5, wherein the determination is carried out for each partial path.

21. The method according to claim 12, wherein the calculation in the control device of a transport path is carried out based on the objects.

22. The method according to claim 17, wherein the value of a status parameter is entitled to a control device for the automated control of the pipe network.

23. A computer program product for the automated control of a pipe network for a transport of flow media, with the pipe network providing a plurality of transport paths between a source and a target and having at least one of a plurality of line sections, control modules and a combination thereof, the computer program product comprising one or several machine-readable non-transitory media with instructions causing a computer to:
- automatically calculate a transport path for flow medium between a predetermined source and a predetermined target, where the instructions to calculate the transport path include instructions to calculate a sequence of at least one of line sections, control modules, and a combination thereof between the source and the target,
- wherein the flow medium to be transported is pushed by means of a pushing medium, wherein the pushing medium is in particular provided at a pushing medium source, and the calculation of the transport path comprises a determination of a pushing medium source in the proximity of the source according to a predetermined criterion, the predetermined criterion comprising a maximum distance from the predetermined source or the predetermined target to the pushing medium source,
- wherein the calculation of the transport path comprises a calculation of a preparing treatment of the pipe network and/or a post-processing treatment of the pipe network,
- wherein the preparing treatment and/or the post-processing treatment comprises a pre-rinsing of at least a portion of the transport path with a rinsing medium, a removal of the rinsing medium by means of the flow medium to be transported, a removal of the flow medium to be transported at least from a portion of the transport path by means of the pushing medium, and/or a post-rinsing with a rinsing medium.

24. A control device for the automated control of a pipeline network for the transport of flow media, wherein the pipeline network provides a plurality of transport paths between a source and a target, and wherein the pipeline network comprises a plurality of line sections and control modules,
- wherein the control device is designed for the automatic calculation of a transport path for a flow medium between a predetermined source and a predetermined target, and wherein the calculation of a transport path comprises a calculation of a sequence of one of line sections, control modules, and a combination thereof between the source and the target, and
- wherein the flow medium to be transported is pushed by means of a pushing medium, wherein the pushing medium is in particular provided at a pushing medium source, and the calculation of the transport path comprises a determination of a pushing medium source in the proximity of the source according to a predetermined criterion, the predetermined criterion comprising a maximum distance from the predetermined source or the predetermined target to the pushing medium source,
- wherein the calculation of the transport path comprises a calculation of a preparing treatment of the pipe network and/or a post-processing treatment of the pipe network,
- wherein the preparing treatment and/or the post-processing treatment comprises a pre-rinsing of at least a portion of the transport path with a rinsing medium, a removal of the rinsing medium by means of the flow medium to be transported, a removal of the flow medium to be transported at least from a portion of the transport path by means of the pushing medium, and/or a post-rinsing with a rinsing medium.

25. The method according to claim 24, wherein the pipeline network is in a brewing plant.

* * * * *